(12) United States Patent
Wurmfeld (10) Patent No.: US 11,468,798 B2
(45) Date of Patent: *Oct. 11, 2022

(54) SYSTEMS, METHODS, AND ARTICLES OF MANUFACTURE FOR TIME-DEPENDENT COLOR-CHANGING ARTICLE

(71) Applicant: Capital One Services, LLC, McLean, VA (US)

(72) Inventor: David Wurmfeld, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/172,952

(22) Filed: Feb. 10, 2021

(65) Prior Publication Data
US 2021/0166586 A1 Jun. 3, 2021

Related U.S. Application Data

(63) Continuation of application No. 16/421,247, filed on May 23, 2019, now Pat. No. 10,943,511.

(51) Int. Cl.
| | |
|---|---|
| *G09F 3/00* | (2006.01) |
| *G06F 1/00* | (2006.01) |
| *B41M 5/52* | (2006.01) |
| *B42D 15/00* | (2006.01) |
| *B42D 25/391* | (2014.01) |

(52) U.S. Cl.
CPC ......... *G09F 3/0291* (2013.01); *B41M 5/5218* (2013.01); *B42D 15/00* (2013.01); *B42D 25/391* (2014.10); *G06F 1/00* (2013.01); *G09F 3/0294* (2013.01)

(58) Field of Classification Search
None
See application file for complete search history.

(56) References Cited

U.S. PATENT DOCUMENTS

| | | | | |
|---|---|---|---|---|
| 6,398,862 | B1 * | 6/2002 | Hechler | C09C 1/0021 106/404 |
| 2010/0288182 | A1 * | 11/2010 | Klots | B42D 25/378 116/207 |
| 2011/0239885 | A1 * | 10/2011 | Marchant | B41M 3/148 283/81 |
| 2015/0161918 | A1 * | 6/2015 | Byrne | H01J 37/32752 428/29 |
| 2018/0137787 | A1 * | 5/2018 | Utz | G09F 3/10 |

* cited by examiner

*Primary Examiner* — Laura C Powers
(74) *Attorney, Agent, or Firm* — Perkins Coie LLP (57) ABSTRACT

Disclosed embodiments may relate to a time-dependent color-changing label for a product. The label may include a first layer comprising a plurality of particles, the particles comprising a time dependent color-changing material that changes color after a predetermined time period, the predetermined time period being greater than one month. The label may also include an attachment structure attaching the first layer to the product. In certain embodiments, the first layer may include a polymer, and the particles may include glass microspheres containing the time-dependent color changing material. The particles may be embedded in the polymer.

18 Claims, 4 Drawing Sheets

SYSTEMS, METHODS, AND ARTICLES OF MANUFACTURE FOR TIME-DEPENDENT COLOR-CHANGING ARTICLE

CROSS-REFERENCE TO RELATED APPLICATIONS

This application is a continuation of U.S. patent application Ser. No. 16/421,247, filed May 23, 2019. The content of the foregoing application is incorporated herein in its entirety by reference.

TECHNICAL FIELD

The disclosed embodiments generally relate to color-changing articles, and more particularly, relate to a time-dependent color-change tag.

BACKGROUND

To complete annual inventorying of physical assets, companies log items, such as computers, monitors, or golf carts. Inventorying allows companies to determine whether they can amortize the depreciation of those assets for accounting and tax purposes. Current systems require individuals to scan a barcode which is then used to query a system to determine whether it should be accounted for. Other systems rely on a user reading small text, such as a serial number, that may be located in a veiled location on or within the device. This requires individuals to spend excess time manipulating and visually inspecting objects.

SUMMARY

The disclosed embodiments address disadvantages of existing systems by providing novel systems, methods, articles, and techniques for providing time-dependent color-changing tags or labels. The disclosed systems, articles, and methods may prevent the solve issues involved in manual inspection of physical assets, such as providing a clear visual indication at a desirable and flexible location that a predetermined amount of time has elapsed since the physical asset was last inspected. The disclosed embodiments are unlike any prior implementations and provide multiple ways, as described below, to provide a time-dependent color changing tag.

Disclosed embodiments may relate to a time-dependent color-changing label for a product. The label may include a first layer comprising a plurality of particles, the particles comprising a time dependent color-changing material that changes color after a predetermined time period, the predetermined time period being greater than one month. The label may also include an attachment structure attaching the first layer to the product.

In certain embodiments, the first layer may include a polymer, and the particles may include glass microspheres containing the time-dependent color changing material. The particles may be embedded in the polymer.

In some embodiments, the label may include a second layer at least partially covering the first layer. The label may also include a third layer, which may encapsulate the first layer against the second layer and include an exposure structure exposing the first layer to ambient atmosphere.

In certain embodiments, the attachment structure may include at least one of an adhesive, a fastener, or a magnet. Also, the first layer may include a printable surface. In some embodiments, the label may include a flexible removable sheet that seals the first layer in an oxygen free environment. The first layer include at least one of polyethylene (PE), polypropylene, acetal, acrylic, nylon (polyamides), polystyrene, polyvinyl chloride (PVC), acrylonitrile butadiene styrene (ABS), or polycarbonate, and the particles may include substantially spherical particles having a diameter of about 15-22 microns.

In some embodiments, the particles may include an oxygen-sensitive material that changes color based on the amount of time the oxygen-sensitive material has been exposed to oxygen. Additionally, the particles may include a material that changes color when exposed to oxygen for at least one year. Further, the particles may include a material that changes color when exposed to oxygen for at least two years.

In some embodiments, the particles may include a pressure-sensitive material that changes color based on the amount of time the pressure-sensitive material has been held at a pressure of at least one atmosphere. Additionally, the particles may include a pressure-sensitive material that changes color when the pressure sensitive material has been held at a pressure of at least one atmosphere for at least one year. Further, the particles may include a material that changes color when exposed to pressures greater than atmospheric pressure for at least two years.

In some embodiments, the particles may include a light-sensitive material that changes color based on the amount of time the light-sensitive material has been exposed to ultraviolet light. Also, the particles may include a material that changes color when exposed to ultraviolet light for at least one year. The particles may change color when exposed to ultraviolet light for at least two years.

Disclosed embodiments may include a printable sheet of time-dependent color-changing labels. The sheet may include a substrate and a plurality of time-dependent color-changing labels. The labels may include a polymer and a plurality of particles and an adhesive layer releasably securing the labels to the substrate. The particles may include a time dependent color-changing chemical.

Disclose embodiments may include a time-dependent color-changing label. The label may include a first layer comprising a plurality of particles, the particles comprising a time dependent color-changing material that changes color after a predetermined time period. The label may also include a second layer encapsulating the first layer, the second layer being transparent, and having a plurality of perforations.

Aspects of the disclosed embodiments may also include a method or a non-transitory tangible computer-readable medium that stores software instructions that, when executed by one or more processors, are configured for and capable of performing and executing one or more of the instructions, methods, operations, and the like, to design, manufacture, and/or use color-changing labels consistent with the disclosed embodiments. For example, embodiments may include a computer-ready medium with software instructions to operate machinery to perform manufacturing steps described in this disclosure.

It is to be understood that both the foregoing general description and the following detailed description are exemplary and explanatory only, and are not restrictive of the disclosed embodiments as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

The disclosed embodiments generally relate to color-changing articles, and more particularly, relate to a time-dependent color-change tag or label. The following detailed description refers to the accompanying drawings. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims. Reference will now be made in detail to the disclosed embodiments, examples of which are illustrated in the accompanying drawings. Wherever convenient, the same reference numbers will be used throughout the drawings to refer to the same or like parts.

Disclosed embodiments may relate to systems, articles of manufacture, and methods for a time-dependent color-changing tag. Previous tags for fixed assets relied on encoded information, such as a serial number or barcode, which is used to identify the physical asset. Once an asset's identity was determined, a user would have to query a database to determine whether the asset had been inventoried in the given inventory period. Therefore, prior processes may have involved a series of steps and required the use of an electronic device to determine an asset's status or even a manual look-up of physical records. To further complicate matters, the encoded information on a physical asset may be hard to locate and, once located, difficult to inspect or read.

Disclosed embodiments may address these and other problems by providing a time-dependent color-changing tag. The tag may change color after a predetermined period of time, such as a time duration corresponding to an inventory period for a given physical asset. The color change may provide a clear and immediate visual indication that a predetermined time period has lapsed. Therefore, rather than searching an item for a barcode, entering the barcode into a computer, querying a database, and waiting for results regarding whether the item is due to be inventoried (e.g., for accounting purposes), a user can immediately observe the color of the tag and determine whether additional inspection is necessary at all. For example, a user can easily see whether a label is blue or red, with the latter indicating that a predetermined amount of time has passed.

Prior systems failed to form an adequate solution to these problems and differ from this disclosure. For example, items that change color may exist. However, such items change color over a short period of time (e.g., minutes, hours, days). Therefore, such items cannot address the problem of providing a visual indication of when an item needs to be inventoried (e.g., quarterly, annually) because they will change color before the inventor time period lapses. Such a premature color change may not provide the pertinent or useful meaning that disclosed embodiments, which change color after months or a year, can.

Disclosed embodiments may be used with physical assets. A physical asset may be any tangible item. In some embodiments, a physical asset may be a tangible item that needs to be inventoried periodically, such as for tax or accounting purposes. For example, business property such as computers, monitors, printers, electronics, tools, and other materials may depreciate over time. Businesses may inventory such assets on an annual basis to record the depreciation. However, each item may have its own depreciation schedule, requiring a business to first determine if an item has previously been inventoried that year or whether it still needs to be inventoried.

In other embodiments, the tangible item may expire, or action may need to be taken in relation to the physical item. For example, medicine or foods may expire after a predetermined period of time, or a car may need to be taken to be inspected annually or quarterly. While some fresh foods expire relatively quickly, certain goods may expire in periods ranging from several months to many years. For example, dry pasta and rice may expire in 8-12 months. It may be more difficult for users to track expiration dates for lasting food items. In addition to expiring at irregular time periods compared with fresh foods, longer-lasting foods may not exhibit clear indicators of expiration. For example, fresh foods may become discolor or put off strong odors when they need to be discarded. By comparison, longer-lasting staple goods, such as rice, dried pasta, and flour, may exhibit more nuanced symptoms of expiration that may require a more time-intensive investigation from a user to evaluate.

Disclosed embodiments may relate to a "tag" or "label." These two terms may be used interchangeably in this disclosure. Tags and labels as discussed herein may refer to an article of manufacture or device that changes color and can be affixed to a physical asset. For changing color, tags and labels may contains time-dependent color-changing particles, such as microspheres. These particles may change color after a predetermined period of time has lapsed.

Disclose embodiments may make use of microspheres. Microspheres may be small hollow glass spheres that can contain one or more chemical compounds. For example, microspheres may be glass spheres having a diameter of 15-22 microns. For example, a glass microsphere may contain one or more time-dependent color-changing chemicals or compounds. The use of microspheres to contain color-changing agents may facilitate time-dependent color changes that occur for time periods of months or years. For example, disclosed embodiments may make use of encapsulation devices (e.g., mircospheres) having a given porosity. These encapsulation devices may hold color-changing chemicals akin to a litmus (e.g., a leuco dye). Based on the porosity or permeability of the encapsulation device, disclosed embodiments may determine the time period by which the active agent (e.g., pressure, atmospheric gas, oxygen, heat) can affect the encapsulated color-chemical. Moreover, because certain example encapsulation devices, such as microspheres, are very small, disclosed embodiments may be able to more finely tune the activation mechanism that affects color change. For example, in embodiments where the color-changing chemical is sensitive to oxygen, disclosed embodiments may compare the molecular weight of oxygen to the porosity of the encapsulation device (e.g., microspheres) to determine the rate at which the encapsulated color changing chemical would be exposed to oxygen. Disclosed embodiments may select an encapsulation mechanism having a given porosity to match a pre-determined time period.

While the present disclosure uses the term "microsphere," other color-changing particles may be used. In some embodiments, the nonspherical shapes may be used. For example, hollow glass orbs may have elliptical, oblong, teardrop, rounded-square, rectangular, pyramidal, and/or other geometric shapes. The glass may also form nonregular geometric shapes, such as nebulous orb shapes. Still other shapes may be used that form hollow glass chambers that can contain the active chemicals, compounds, and/or materials to change color after a predetermined time period. In still other embodiments, materials other than glass may be used to contain the color changing material. For example, a translucent polymer could be used so long as it can contain the color-changing agent. In other examples, the color-changing agent could be implemented in a heterogeneous solid.

Figure 1:
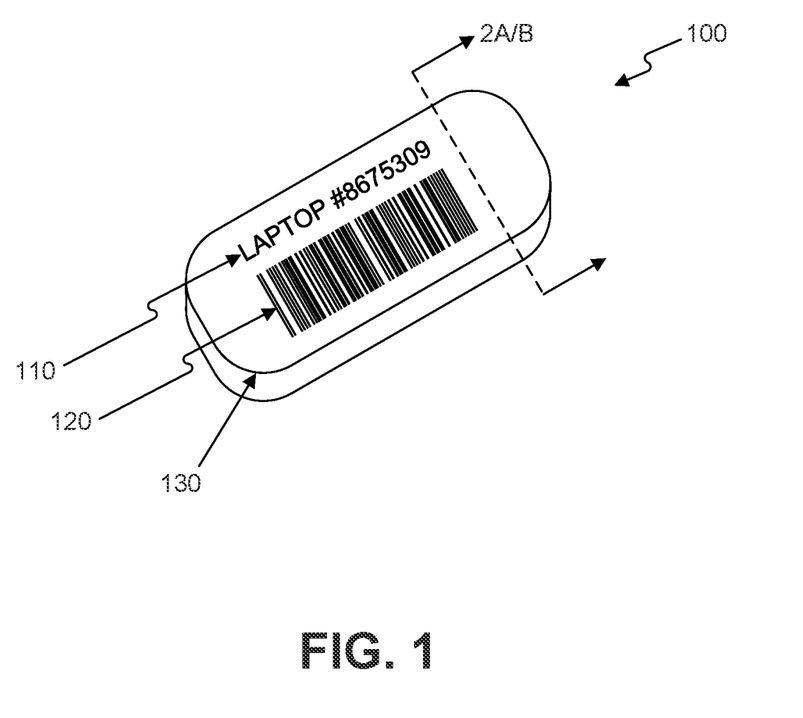
FIG. 1 is a diagram of an exemplary tag, consistent with disclosed embodiments.

FIG. 1 is a diagram of an exemplary tag 100, consistent with disclosed embodiments. Tag 100 may come in different shapes and sizes. As shown, tag 100 forms a rounded rectangular prism. In some embodiments, however, tag 100 may be shaped like an oval, square, or triangle. Still further embodiments may have abstract or more intricate shapes, such as a heart-shape, a star-shape, and/or an "X"-shape.

Although not shown in FIG. 1, tag 100 may have one or more attachment mechanisms. Such mechanisms may be used to secure tag 100 to a physical asset. For example, tag 100 may be secured to a physical asset using one or more of an adhesive, a fastener, a magnet, or a key-ring. In the example of an adhesive, tag 100 may have glue, tape, sticker(s), rubber glue, and/or another adhesive applied to its underside. The adhesive may affix tag 100 to a physical asset. In the example of a fastener, tag 100 may include an opening to accommodate a zip-tie or other fastening mechanism.

In the example of a magnet, tag 100 may include a magnetic material. The magnetic material may include permanent magnets (e.g., neodymium iron boron (NdFeB), samarium cobalt (SmCo), alnico, and/or ceramic/ferrite magnets), temporary magnets (e.g., soft metal magnets), or a combination of the two. The magnetic material(s) may be incorporated into tag 100 in different ways. In some embodiments, the magnetic material may form a backing for tag 100. For example, the magnetic material may form a sheet that is glued to the back of tag 100. In other embodiments, magnetic material may be embedded in tag 100. For example, magnetic material(s) may be placed in the body of tag 100, which may not be visible from an inspection of the exterior of tag 100.

In the example of a key-ring, tag 100 may connect to a plastic or metal loop that can be affixed to an asset. In some embodiments, tag 100 may have a through-hole through which a split ring (also known as a "circle cotter" or "cotter ring") can attached. In addition to or alternatively from a split ring, other types of attachment mechanisms can be used. For example, a carabiner and/or double loop may be used to affix tag 100 to a physical asset. In still other examples, other types of keychain affixing mechanisms may be used to attached tag 100 to a physical asset.

Tag 100 may include top face 130. Top face 130 may include a surface upon which information can be used inscribed. In some embodiments, top face 130 may include a printable and/or engravable surface. For example, top face 130 may include a surface material that can be printed on by an inkjet, dot-matrix, and/or laser printer. In other examples, top face 130 may include a surface material that can be etched, such as by a computer-controlled laser etching machine or a computer numerical control (CNC) end mill or router. In still other examples, top face 130 may include a material that can be engraved using a mold or seal matrix/die, such as a wax or polymer that can be heated. Once heated, a molding can be pressed into the material of top face 130 to engrave text, patterns, and/or images.

In some embodiments, information that can be inscribed on top face 130 may include text 110 and/or codes, such as a barcode 120. Text 110 may include a combination of characters that may form one or more words. The words may be related to tag 100 or a particular physical asset. For example, as shown in FIG. 1, text 110 may include a word describing a physical asset (e.g., "laptop") and a numerical identifier. Text 110 may advantageously allow a user to easily determine that tag 100 is affixed to a proper associated device. For example, if text 110 of tag 100 includes "laptop," a user may be able to readily recognize that tag 100 has been tampered with or moved if it is attached to a printer, food, or another physical asset that is not a laptop. Text 110 may also allow a user to easily determine to which physical asset a given tag 100 should be affixed, in situations where tag 100 becomes detached from a physical asset. For example, a user may have a travel bag with a laptop and tablet, each having a tag 100 affixed to them. During transport, the tags of the laptop and tablet may become detached. Because tag 100 of the laptop includes text 110 reciting, at least in part, "LAPTOP" and tag 100 of the tablet includes text 110 reciting, at least in part, "TABLET," a user may be more easily able to determine which tag is associated with each physical asset, which may allow the user to more quickly and easily reattach the tags to their respective physical assets.

Although not shown in FIG. 1, text 110 may include other data, such as physical descriptors of a physical asset (e.g., "WINDOWS LAPTOP," "BLUE PHONE," "OLD PRINTER," "DAVID'S CAMERA"). In still further examples, although not shown in FIG. 1, text 110 may include an expiration date (e.g., "EXPIRES 07/11/2027," "FEB. 2020," "31 OCT 2022"). Other text may be used consistent with this disclosure, such as an identification of the owner or company associated with the physical asset (e.g., "PROPERTY OF TOP BANK OF FARMTOWN," "JOHN SMITH'S LAPTOP") or a location of the physical asset (e.g., "FIFTH FLOOR PRINTER").

Barcode 120 may include an optical, machine-readable representation of data. Barcode 120 may include parallel lines to a linear or one-dimensional (1D) barcode (e.g., a Universal Product Code (UPC) barcode) and/or two-dimensional (2D) barcode, which may also be referred to as "matrix codes" (e.g., a quick-response (QR) code). 2D barcodes may include rectangles, dots, hexagons, and other geometric patterns.

Barcode 120 may encode an identifier. In some embodiments the identifier may be uniquely associated with tag 100 and/or a physical asset. For example, barcode 120 may encode a numeric or alphanumeric code linked to tag 100 and/or a physical asset. In the example of the code being linked to a physical asset, the code may be a serial number, model number, or other identifier associated with the physical asset. Barcode 120 may encode information presented in text 110 (e.g., "8675309" as shown in FIG. 1).

Figure 2A:
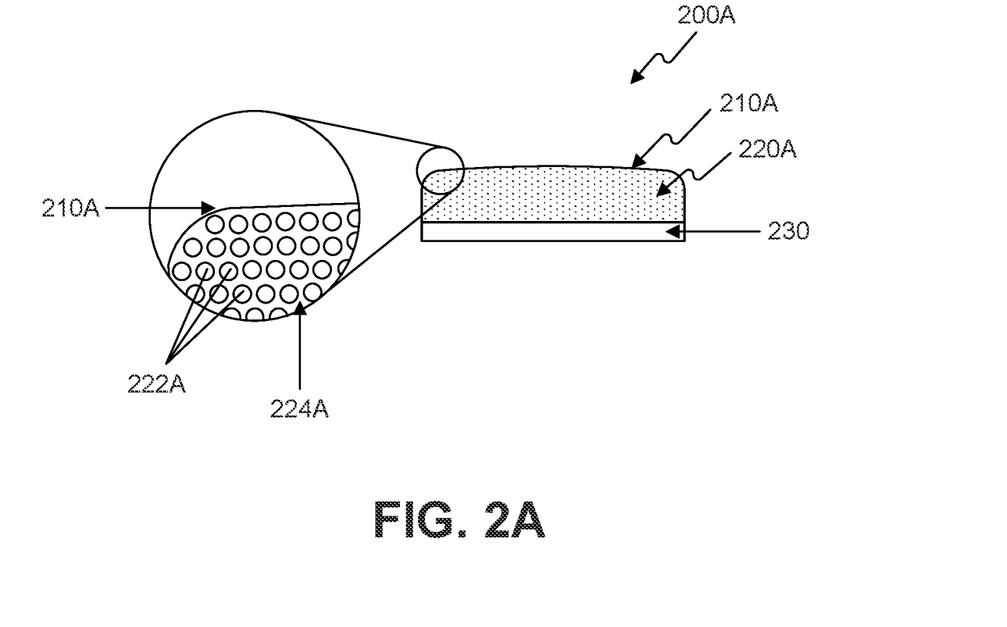
FIG. 2A is a cross-sectional diagram of an exemplary tag, consistent with disclosed embodiments.
Figure 2B:
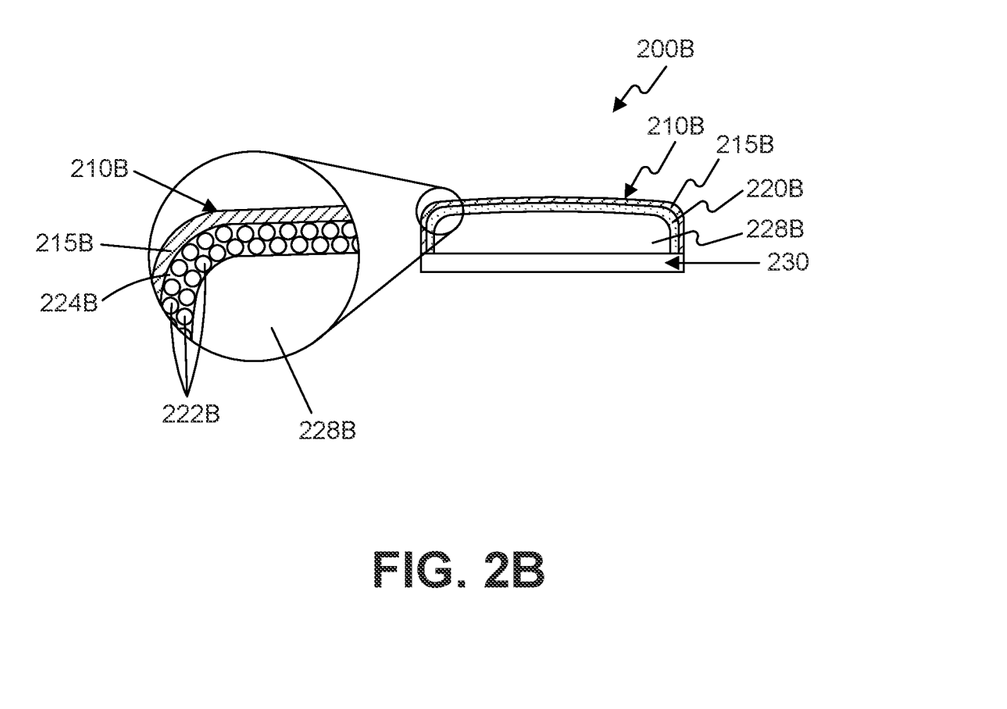
FIG. 2B is a cross-sectional diagram of an exemplary tag, consistent with disclosed embodiments.

As shown in FIG. 1, line 2A/B defines the boundary by which the cross-sectional views of FIGS. 2A and 2B are generated in relation to tag 100. FIG. 2A is an example cross-sectional diagram of an exemplary tag 200A (e.g., an example implementation of tag 100 of FIG. 1), consistent with disclosed embodiments.

As shown in FIG. 2A, tag 200A may include top face 210A, impregnated body 220A, and/or backing 230. Although tag 200A is shown in a particular shape and arrangement, alternative arrangements of top face 210A, impregnated body 220A, backing 230, and/or other portions (not shown) may be used consistent with disclosed embodiments. For example, the cross-sectional view may take a different shape, such as a triangular cross-section, a circular cross-section, and the like. In other examples of alternative, not-shown embodiments, backing 230 may cover two or more sides of impregnated body 220A or partially surrounded by impregnated body 220A, even though it is only shown in FIG. 2A as covering one side.

In some embodiments, top face 210A has the same features as that described for top face 130 of tag 100 for FIG. 1. For example, top face 210A may include text 110, barcode 120, and/or other images or symbols.

In embodiments, tag 200A may include impregnated body 220A. Impregnated body 220A may form the substantive structure of tag 200A and may include time-dependent color-changing material. In some embodiments, impregnated body 220A may include particles 222A and/or bonding material 224A.

Particles 222A may include a chemical and/or chemical compound (also referred to as a "color-changing agent" in this disclosure) that changes color after a predetermined period of time. The time period may be on the order of months (e.g., one month, two months, three months, four months, six months, nine months, and the like) or on the order of years (e.g., one year, one and half years, two years, and the like). The color-changing agent may change color on the basis of pressure, exposure to oxygen, and/or exposure to particular wavelengths on the electromagnetic spectrum (e.g., visible light, ultraviolet (UV) light, infrared light (IR) and the like). For example, certain color-changing agents may be sensitive to atmospheric pressure. In this example, tag 200A may be stored in a container that holds it at a negative or positive pressure, relative to atmospheric pressure. These color-changing agents may change, for example, from blue to red (or another color) after being exposed to atmospheric pressure for one or more of the predefined time periods discussed above. In addition to pressure, certain chemicals may react to temperature, such as in increase in ambient temperature. Example heat-sensitive and pressure-sensitive chemicals include Benzoyl Leuco Methylene Blue and Crystal Violet Lactone. Other heat-sensitive and pressure-sensitive chemicals may be used consistent with disclosed embodiments.

In another example, the color-changing agent may be sensitive to oxygen or another atmospheric gas, such as oxygen and/or carbon dioxide. In this example, tag 200A may be stored in a container that holds it in a relative vacuum or in an environment with inert gases. Example color-changing agents that are sensitive to atmospheric gases may include indigo white (also referred to a "leuco-indigo," which turns blue when exposed to oxygen). These color-changing agents may change, for example, from blue to red (or another color) after being exposed to an environment containing oxygen for one or more of the predefined time periods discussed above. Other chemicals sensitive to atmospheric gases may be used, consistent with disclosed embodiments.

In another example, the color-changing agent may be sensitive to a particular range of the electromagnetic spectrum, such as visible light, UV light, IR light, and the like. In this example, tag 200A may be stored in a container that blocks tag 200A from being exposed to the particular range of light. For example, a black bag may block visible light. In another example, a removable film or coating that blocks the activating wavelength(s) may be applied to tag 200A, and a user may peel away this film in order to activate the color changing of tag 200A (e.g., start the predefined time period). Example color-changing agents that are sensitive to particular wavelengths of the electromagnetic spectrum may include photochromic materials, such as triarylmethanes, stilbenes, azastilbenes, nitrones, fulgides, spiropyrans, naphthopyrans, spiro-oxazines, quinones. These color-changing agents may change, for example, from blue to red (or another color) after being exposed to an environment containing oxygen for one or more of the predefined time periods discussed above.

In some embodiments, particles 222A may use microspheres, as previously described in this disclosure, to hold the color-changing agent. Microspheres may enable the color-changing agent to change color over longer periods of time, such as month or years. For example, hollow microspheres made of glass and/or another polymer, as previously discussed in this disclosure, may be used to contain one or more color-changing agents.

Impregnated body 220A may include bonding material 224A to hold particles 222A together in a solid structure. In some embodiments, bonding material 224A may include a polymer. For example, bonding material 224A may include polyethylene (PE), polypropylene, acetal, acrylic, nylon (polyamides), polystyrene, polyvinyl chloride (PVC), acrylonitrile butadiene styrene (ABS), and/or polycarbonate. In some embodiments, bonding material 224A may be heated to a molten state so that it can be combined with particles 222A. In some examples, the molten bonding material 224A and particles 222A may be mixed to ensure that particles 222A are more uniformly distributed throughout bonding material 224A.

In some embodiments, impregnated body 220A may be attached to backing 230. Backing 230 may include an adhesive or other attaching mechanism. For example, backing may include double-sided tape, rubber cement, an epoxy, or other type of bonding agent to adhere tag 200A to one or more physical assets. In some embodiments, backing 230 may include magnetic material or other types of attaching mechanisms or materials discussed in this disclosure.

FIG. 2B is an example cross-sectional diagram of another exemplary tag, consistent with disclosed embodiments. As shown in FIG. 2B, tag 200B may include top face 210B, protective layer 215B, impregnated layer 220B, and/or backing 230. Although tag 200B is shown in a particular shape and arrangement, alternative arrangements of top face 210B, impregnated body protective layer 215B, impregnated layer 220B, body 228B, backing 230, and/or other portions (not shown) may be used consistent with disclosed embodiments. For example, the cross-sectional view may take a different shape, such as a triangular cross-section, a circular cross-section, and the like. In other examples of alternative, not-shown embodiments, backing 230 may cover two or more sides of body 228B or partially surrounded by body 228B, even though it is only shown in FIG. 2B as covering one side. Additionally, in some embodiments, certain depicted components may be omitted. For example, some embodiments may not include protective layer 215B.

In embodiments, tag 200B may include body 228B, impregnated layer 220B, protective layer 215B, and/or backing 230. Generally, tag 200B may be similar to tag 200A in that both include a portion that consists of bonding material (e.g., bonding material 224A, bonding material 224B) and time-dependent color-changing particles (e.g., particles 222A, particles 222B). However, unlike tag 200A, tag 200B may include a body (e.g., body 228B) to which a coating or layer of bonding material and color-changing particles are applied. Tag 200B, therefore, may allow more complicated objects to be coated with time-dependent color-changing material. Further, should the active agent or other aspects of the time-dependent color-changing particles (e.g., particles 222A, particles 222B) be very costly, tag 200B may advantageously conserve the amount of particles used by concentrating them on the surface of the tag.

Some embodiments may include body 228B. Body 228B may form the substantive structure of tag 200B. Any object which is capable of receiving a polymer-based coating may be used as body 228B. For example, body 228B may be made of metal, plastic, organic materials (e.g., wood), or any other material that can be coated. While body 228B is shown as a monolithic slab, more intricate and/or ornate objection could be used as body 228B. For example, body 228B could be shaped like a star, Christmas tree, or company logo.

Body 228B may be covered by impregnated layer 220B. In some embodiments, impregnated layer may be applied as a coating over all or a portion of body 228B. Impregnated layer 220B may be made up of bonding material 224B and particles 222B. Impregnated layer 220B may be made in the same manner as described for impregnated body 220A. For example, particles 222B may be the same as those described for particles 222A of FIG. 2A. As another example, Bonding material 224B may be the same as that described for bonding material 224A for FIG. 2A. Particles 222B and bonding material 224B may be combined as described for impregnated body 220A. However, rather than forming a solid body, impregnated layer 220B may be applied as a coating. In some embodiments, body 228B may be dipped into a molten form of material to form impregnated later 220B. In other embodiments, impregnated later 220B may be a layer that is applied to body 228B using a thermoform process.

In some embodiments tag 200B may include protective layer 215B which may cover impregnated layer 220B. Protective layer 215B may serve as a transparent coating that prevents erosion of impregnated layer 220B. For example, because impregnated layer 220B is relatively thin, it may be susceptible to wear, vandalism, or other abrasive activities that would remove material of impregnated layer 220B. protective layer 215B may provide a safeguard to prevent the removal of impregnated layer 220B from body 228B.

Protective layer 215B may be modified so as to neutralize any deleterious affect it would otherwise have on time-dependent color-changing particles 222B of impregnated layer 220B. In some embodiments, protective layer 215B may include perforations to allow ambient air to flow through to particles 222B of impregnated layer 220B. For example, protective layer 215B may include microperforations to allow environmental air pressure and gases to flow through to impregnated layer 220B. Therefore, if particles 222B are activated by pressure or atmospheric gases, the pressure and gases of the surrounding environment may affect particles 222B even when protective layer 215B is applied. In some embodiments, protective layer 215B may be made as to allow free transmission of certain wavelengths of the electromagnetic spectrum. For example, protective layer 215B may be clear to allow visible light spectra to be received by impregnated layer 220B. In embodiments where particles 222B are activated by UV or IR spectra, protective layer 215B may be made of a material that does not block those forms for electromagnetic radiation.

With or without protective layer 215B, tag 200B may include top face 210B. In some embodiments, top face 210B has the same features as that described for top face 130 of tag 100 for FIG. 1. For example, top face 210B may include text 110, barcode 120, and/or other images or symbols. In embodiments where tag 200B has protective layer 215B, top face 210B may be the external surface of protective layer 215B. In embodiments where tag 200B does not include protective layer 215B (not shown), top face 210B may be external face of impregnated layer 220B.

Tag 200B may include backing 230. Backing 230 of tag 200B may be the same backing 230 as that of tag 200A, which is why the same identifier is used in both FIGS. 2A and 2B for backing 230.

Figure 3A:
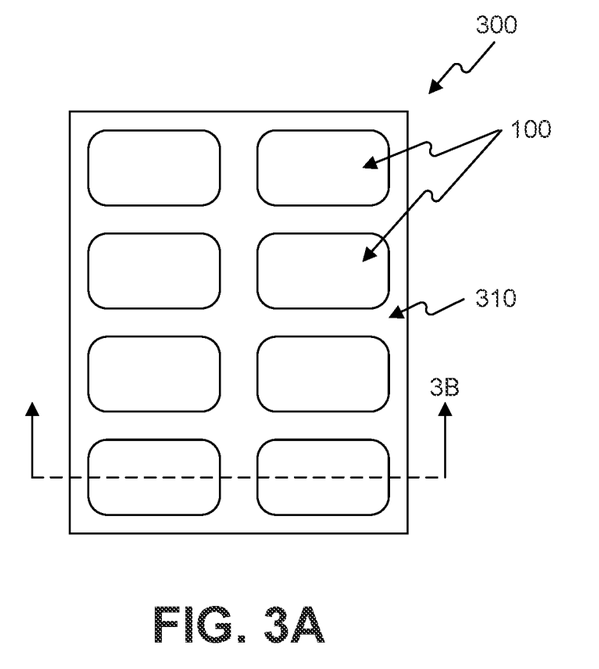
FIG. 3A is a front view of an exemplary group of tags, consistent with disclosed embodiments.
Figure 3B:
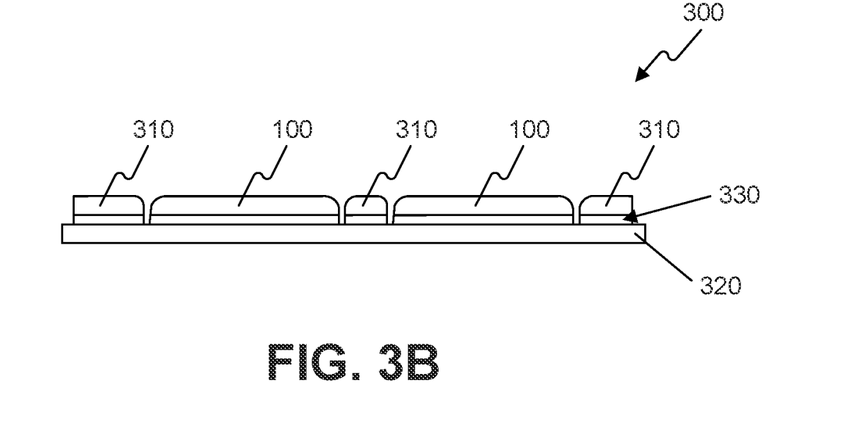
FIG. 3B is a cross-sectional diagram of the group of tags of FIG. 3A, consistent with disclosed embodiments.

FIGS. 3A and 3B depict front and cross-sectional views of an exemplary group of tags 300A, consistent with disclosed embodiments. Line 3B of FIG. 3A denotes the section along which the cross-sectional view of sheet 300 in FIG. 3B is taken. Because FIGS. 3A and 3B are different views of the same product, they are described using the same reference numbers.

Some embodiments may include a sheet 300. Sheet 300 may serve as a carrier for multiple tags 100. For example, when applying tags to multiple physical assets, it may be beneficial to have multiple tags readily accessible. Sheet 300 may allow a user to quickly and easily access a supply of tags 100 when labeling physical assets.

Sheet 300 may be printable. In some applications, it may be beneficial to apply tag-specific information to many tags at once. For example, when sheet 300 is initially created, the top faces (e.g., top face 130) of each of tag 100 in sheet 300 may be blank. Sheet 300 may facilitate marking, such as by printing, engraving, or etching text 110 and/or barcode 120 (as discussed in relation to FIG. 1). Sheet 300 may be sized to fit into existing printing, etching, and/or engraving machines. For example, sheet 300 may be sized to be 8.5" by 11" to fit into standing printing devices. Other standard paper sizes, such as legal-sized paper, A4, A5, and the like, may be used as well.

Sheet 300 may include substrate 320. Substrate 320 may serve as a structural foundation upon which the layers or portions of one or more of tag 100 is manufactured and store. Sheet 300 may be made of a material that allows each tag 100 to be temporarily secured to it. For example, sheet 300 may be made of waxed paper, a polymer with a smooth finish, or other material with a finish capable of releasing a tag 100 when secured using an adhesive.

Sheet 300 may include material 310 and one or more tags 100. Material 310 may be excess material from the scoring procedure described below. Tag 100 may consist of the tags described in FIG. 2A (e.g., tag 200A) and/or FIG. 2B (e.g., tag 200B).

Sheet 300 may include backing 330. Backing 330 may releasably secure each of tags 100 to substrate 320. For example, backing 330 may include an adhesive material that allow a user to peel away a single tag 100 from substrate 320 and secure tag 100 to a physical asset. Backing 330 may come in other forms, such as those described for backing 230 in relation to FIGS. 2A and 2B.

Sheet 300 may be formed by scoring a layered structure. In some embodiments, sheet 300 may be formed by applying a continuous backing layer (e.g., the same material as backing 330) on substrate 320 and a continuous layer of additional time-dependent color-changing material (e.g., the same material as that discussed for impregnated body 220A of tag 200A in FIG. 2A and/or a combination of body 228B and impregnated layer 220B of tag 200B in FIG. 2B). The continuous layers may be cut (e.g., etched, scored, die-cut) to separate one or more tags 100 from material 310. Although sheet 300 is shown with eight rounded-rectangular tags, additional shapes and designs may be used. For example, disclosed embodiment may divide sheet 300 into one or more tags 100 having a circular shape, triangular shape, or other shape as discussed elsewhere in this disclosure. Additionally, sheet 300 may include a hole etched in one or more tags 100, such as to attach a keyring, as previously discussed in this disclosure.

Although not shown, in some embodiments, sheet 300 may lack substrate 320. For example, rather than cutting or etching the entire perimeter of each of tag 100. Tag 100 may be secured to material 310 by perforating the perimeter border between tag 100 and material 310. In such an embodiment, rather than peeling a tag 100 off of substrate 320 to apply it, a user may sever the remaining connections between tag 100 and material 310 to release tag 100 from material 310.

Figure 4:
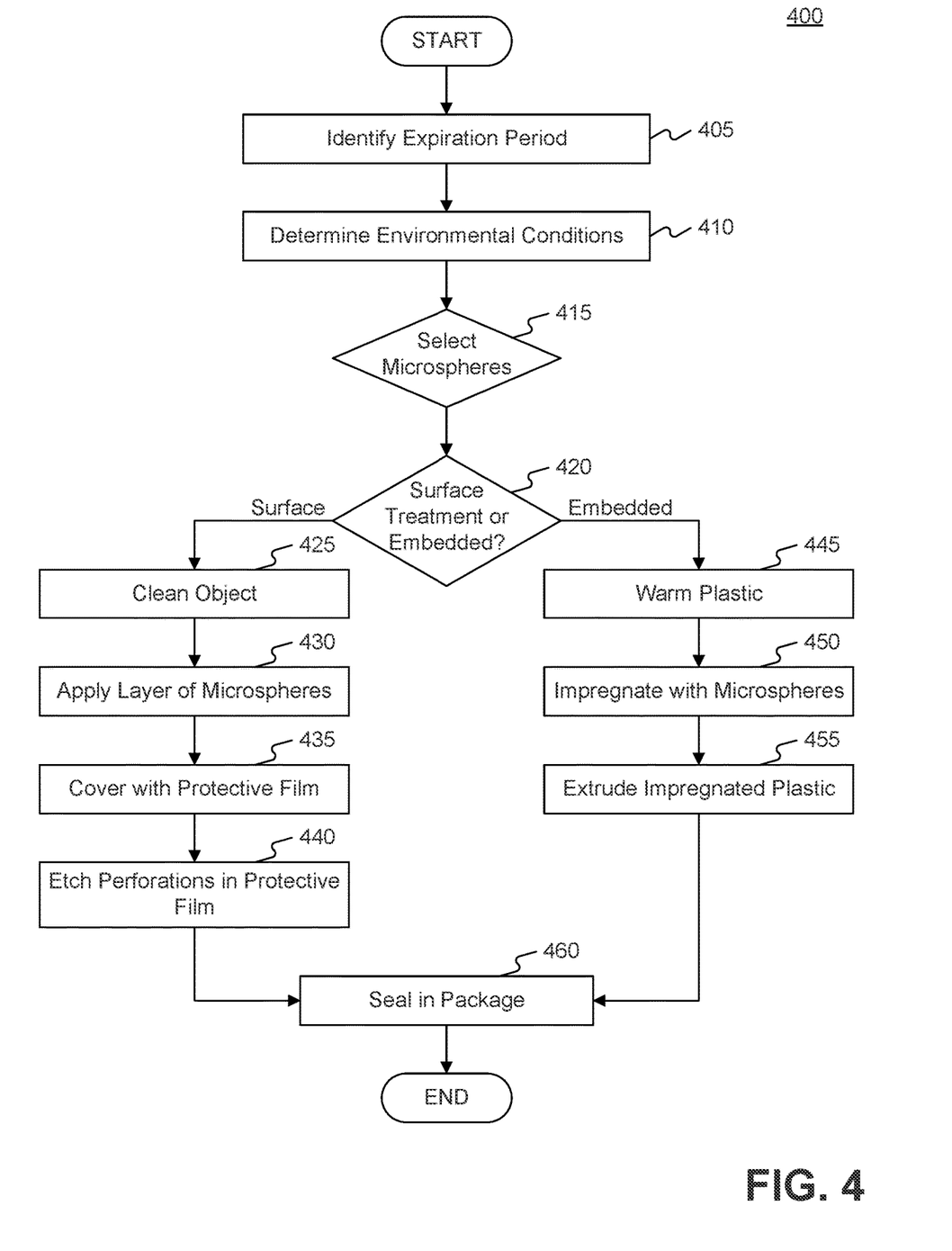
FIG. 4 is a process flow diagram of an exemplary process of manufacturing tags, consistent with disclosed embodiments.

FIG. 4 is a flow diagram of an exemplary process 400 for manufacturing tags, consistent with disclosed embodiments. For example, process 400 may depict steps to make a tag, such as tag 200A or tag 200B for FIGS. 2A and 2B, respectively. In the following description, reference is made to certain components of FIGS. 1, 2A, and 2B for purposes of illustration. For example, FIG. 4 may depict process 400 with method steps shown for creating tag 100, tag 200A, and/or tag 200B. It should be appreciated, however, that other implementations are possible. For example, process 400 may be used to manufacture articles and components other than those illustrated above in FIGS. 1, 2A, and/or 2B. A manufacturing system containing computer-controlled manufacturing equipment (e.g., an extruder, a robotic arm, a mixer, one or more material dispensers, molding equipment, engraving/printing equipment, and the like) and a computer, including memory and a processor, may be used to implement process 400 as described below. For example, process 400 may be implemented as instructions stored on a non-transitory computer-readable storage medium that, when executed by one or more processors, cause the processor to perform steps of process 400. The processors may control the computer-controlled manufacturing equipment to implement the described steps.

In step 405, process 400 may identify an expiration period. A manufacturing system may receive a numerical value corresponding to a period after which a tag (e.g., tag 100, tag 200A, tag 200B) should change color. For example, a computing device associated with the manufacturing system may receive a time period of months or years, such as "2 months" or "1.5 years."

In step 410, process 400 may determine environmental conditions. A manufacturing system may receive input identifying the conditions of the environment which the tag may be located. In some embodiments, a computing system associated with the manufacturing system may provide a graphical user interface (GUI) presenting options to select to describe the environment. For example, a GUI may ask a user to select boxes corresponding to whether the environment will be at atmospheric pressure, climate controlled, exposed to the sun (e.g., UV spectrum), exposed to indoor lights (e.g., visible spectrum), exposed to IR sources, held at atmospheric pressure, and/or exposed to ambient air (e.g., oxygen). In an example implementation, a user may interact with the GUI to select that no light will be present regularly, such as in an application where the tag will be affixed to an object that is stored in an unlit closet with no windows (e.g., no regular sun or light exposure). In another example implementation, a user may interact with the GUI to select that ambient air exposure may be limited, such as in an application where the tag will be affixed to a physical asset that is stored in a sealed vault without air circulation.

In step 415, process 400 may select microspheres. A manufacturing system may select one or more types of particles (e.g., particles 222A, particles 222B, etc) based on the input received in step 405 and/or step 410. For example, the manufacturing system may identify which microsphere material dispenser corresponds to the type of microsphere that will change color after the time period identified in step 405 based on the environmental conditions identified in step 410. In an example implementation, information received by the computing system associated with the manufacturing system may dictate that certain types of microspheres may not activate or predictably change color after the predetermined time period has lapsed based on environmental factors. In the example of the unlit closet, the manufacturing system may exclude microspheres that are activated based on light from being used and determine that oxygen and/or pressure-activated microspheres should be used. In the example of the vault, the manufacturing system may determine that pressure-activated microspheres should be used, not oxygen-based ones. In this example, if GUI input indicates that the vault is regularly lit by fluorescent lights, the manufacturing system may select microspheres that are activated by light, in addition or alternatively from those activated by pressure. The computing system of the manufacturing system may control dispensers (e.g., via a servo) to release the selected type(s) of microspheres.

In step 420, process 400 may determine whether to create tags with a surface treatment of microspheres or embedded microspheres. The computing system of the manufacturing system may receive a selection of the type of treatment via a GUI. In other examples, the computing system may identify the type of treatment based on the supply of the microspheres used. For example, the surface treatment (e.g., tag 200B) may use fewer microspheres than a tag with embedded microspheres in the body (e.g., tag 200A). If supplies of the microspheres are running low, computing system may automatically select the type of microsphere application that requires fewer microspheres to conserve resources.

Responsive to determining that surface treatment of microspheres should be used (e.g., step 420, "Surface"), process 400 proceeds to step 425. In step 425, process 400 may clean an object (e.g., body 228B). The manufacturing system may control cleaning equipment to scrub and/or wash the object. The system may additionally or alternatively scuff the surface of body 228B to ensure adhesion of impregnated layer 220B. Additional pretreatment steps may be used to ensure that body 228B is prepared to properly receive impregnated layer 220B, such as washing body 228B with surfactant or solvent (e.g., acetone).

In step 430, process 400 may apply a layer that includes time-dependent color-changing particles, such as microspheres. In some embodiments, the manufacturing system may control a heater and mixer to melt bonding material 224B and mix in particles 222B. For example, the computer associated with the manufacturing system may activate a relay to power a heater and transmit a signal to heat it to a temperature at which bonding material 224B becomes mixable with particles 222B. The computer may control the manufacturing system to extrude the mixed bonding material 224B and particles 222B onto body 228B to form impregnated layer 220B.

In step 435, process 400 may cover the object with one or more protective films. The manufacturing system may apply protective layer 215B onto body 228B coated with impregnated layer 220B. For example, the computing device may control manufacturing system to apply a shrink-wrap film (e.g., heat-shrink film). The system may select a film based on the type of particles 222B used. For example, when particles 222B are light sensitive to particular wavelengths of electromagnetic spectra, the manufacturing system may select a film for protective layer 215B.

In step 440, process 400 may create perforations in one of more protective films. The manufacturing system may control, for example, a laser or cutter to etch or cut small holes into protective layer 215B. For example, the computing system associated with the manufacturing system may transmit coordinates associated with a perforation pattern to a computer-controlled laser or cutter. In some embodiments, particles 222B may activate without exposure to oxygen. In such instances, the manufacturing system may omit step 440 from process 400.

Responsive to determining that embedded microspheres should be used (e.g., step 420, "Embedded"), process 400 proceeds to step 445. In step 445, process 400 may warm bonding material 224A. In some embodiments, the manufacturing system may control a heater to melt bonding material 224A. For example, the computer associated with the manufacturing system may activate a relay to power a heater and transmit a signal to heat it to a temperature at which bonding material 224A becomes mixable with particles 222B.

In step 450, process 400 may impregnate bonding material 224A with microspheres. In some embodiments, the manufacturing system may control a mixer to mix in particles 222B into the heated bonding material 224A. For example, the computer associated with the manufacturing system may activate a relay to power a mixing motor while also controlling a servo to release selected particles 222B.

In step 455, process 400 may extrude impregnated bonding material 224A. The computer may control the manufacturing system to extrude the mixed bonding material 224A and particles 222A to form impregnated body 220A. In some embodiments, the manufacturing system may select a die through which to extrude the molten impregnated bonding material 224A, based on the desired shape of tag 200A. In still other embodiments the mixture of bonding material 224A and particles 222A may be formed into a desired shape using an injection mold, thermoform mold, and/or other polymer shaping techniques.

In step 460, process 400 may seal one or more tags in a package. The manufacturing system may place one or more tags (e.g., tag 100, tag 200A, tag 200B) into a bag or box to prevent exposing particles (e.g., particles 222A, particles 222B) to the environmental triggers that would initiate their time-dependent color change. Depending on the activating mechanism for the particles, the packaging may include different features to inhibit the start of the color-changing process. For example, if the color-changing agent is sensitive to a particular range of the electromagnetic spectrum, such as visible light, UV light, IR light, the tag may be stored in a container that blocks the tag from being exposed to the particular range of light. For example, a black bag may block visible light. In another example, a removable film or coating that blocks the activating wavelength(s) may be applied to a tag, and a user may peel away this film in order to activate the color changing of the tag (e.g., start the predefined time period).

In the example of oxygen or other atmospheric gas activating the color change, the manufacturing system may control the packaging mechanism to store the tag in a vacuum or an inert gas. In the example of an atmospheric pressure-activated particle being used, the manufacturing system may operating machinery to store the tag in a vessel that has positive or negative pressure, as is necessary to inhibit the color changing process. In some embodiments, computing system may recognize the necessary storage mechanism based on the type of color-changing particles used.

Descriptions of the disclosed embodiments are not exhaustive and are not limited to the precise forms or embodiments disclosed. Modifications and adaptations of the embodiments will be apparent from consideration of the specification and practice of the disclosed embodiments. For example, the described implementations include particular types of materials for given components. Unnamed materials, however, may be substituted for those example materials listed consistent with disclosed embodiments. Additionally, the disclosed embodiments are not limited to the examples discussed herein.

In this description, the conjunction "and/or" may mean each of the listed items individual, a combination of the listed items, or both. Moreover, the "and/or" conjunction as used in this specification may include all combinations, sub-combinations, and permutations of listed items. For example, the phrase "A, B, and/or C" may mean each of A, B, and C individually, as well as A, B, and C together in addition to sub-groups A and B, A and C, and B and C. Unless specified otherwise, this example use of "and/or" may also intend to include all potential orders of items in each group and sub-group, such as B-C-A, B-A-C, C-A-B, C-B-A, and A-C-B, along with the subgroups C-B, B-A, and C-A.

Moreover, while illustrative embodiments have been described herein, the scope includes any and all embodiments having equivalent elements, modifications, omissions, combinations (e.g., aspects across various embodiments), adaptations, or alterations based on the present disclosure. The elements in the claims are to be interpreted broadly based on the language employed in the claims and not limited to examples described in the present specification or during the prosecution of the application, of which examples are to be construed as non-exclusive. Further, the steps of the disclosed methods may be modified in any manner, including by reordering steps or inserting or deleting steps. It is intended, therefore, that the specification and examples be considered as exemplary only, with the true scope and spirit being indicated by the following claims and their full scope of equivalents.

What is claimed is:

1. A time-dependent color-changing label for a product, comprising:
    a first layer comprising particles embedded in a polymer, wherein the particles comprise a time-dependent color-changing material that changes color after a predetermined time period and wherein the particles are encapsulated into one or more encapsulation devices that have a porosity that corresponds to the predetermined time period after which a color change occurs; and a second layer at least partially covering the first layer, wherein the second layer comprises a plurality of perforations configured to expose the first layer to ambient atmosphere.

2. The label of claim 1, further comprising an attachment structure configured to attach the first layer to the product, wherein the attachment structure comprises at least one of an adhesive, a fastener, or a magnet.

3. The label of claim 1, wherein the first layer comprises a printable surface.

4. The label of claim 1, wherein the polymer is at least one of polyethylene (PE), polypropylene, acetal, acrylic, nylon (polyamides), polystyrene, polyvinyl chloride (PVC), acrylonitrile butadiene styrene (ABS), or polycarbonate.

5. The label of claim 1, wherein the particles comprise substantially spherical particles having a diameter of about 15-22 microns.

6. The label of claim 1, wherein the particles comprise an oxygen-sensitive material that changes color based on an amount of time the oxygen-sensitive material has been exposed to oxygen.

7. The label of claim 6, wherein the particles comprise a material that changes color when exposed to oxygen for at least one year.

8. The label of claim 6, wherein the particles comprise a material that changes color when exposed to oxygen for at least two years.

9. The label of claim 1, wherein the particles comprise a pressure-sensitive material that changes color based on an amount of time the pressure-sensitive material has been held at a pressure of at least one atmosphere.

10. The label of claim 9, wherein the particles comprise a pressure-sensitive material that changes color when the pressure-sensitive material has been held at a pressure of at least one atmosphere for at least one year.

11. The label of claim 10, wherein the particles comprise a material that changes color when exposed to pressures greater than atmospheric pressure for at least two years.

12. The label of claim 1, wherein the particles comprise a light-sensitive material that changes color based on an amount of time the light-sensitive material has been exposed to ultraviolet light.

13. The label of claim 12, wherein the particles comprise a material that changes color when exposed to ultraviolet light for at least one year.

14. The label of claim 12, wherein the particles change color when exposed to ultraviolet light for at least two years.

15. A printable sheet of time-dependent color-changing labels, comprising:
    a substrate; and
    a plurality of time-dependent color-changing labels comprising:
        a first layer having a polymer and particles embedded in the polymer, wherein the particles comprise a time-dependent color-changing chemical and wherein the particles are encapsulated into one or more encapsulation devices that have a porosity that corresponds to a predetermined time period after which a color change occurs;
        a second layer at least partially covering the first layer, wherein the second layer comprises a plurality of perforations configured to expose the first layer to ambient atmosphere; and
        an adhesive layer releasably securing the time-dependent color-changing labels to the substrate.

16. The printable sheet of time-dependent color-changing labels of claim 15, wherein the particles comprise an oxygen-sensitive material that changes color based on an amount of time the oxygen-sensitive material has been exposed to oxygen.

17. A time-dependent color-changing label, comprising:
    a first layer comprising particles embedded in a polymer, wherein the particles comprise a time-dependent color-changing material that changes color after a predetermined time period and wherein the particles are encapsulated into one or more encapsulation devices that have a porosity that corresponds to the predetermined time period after which a color change occurs; and
    a second layer at least partially covering the first layer, wherein the second layer comprises a plurality of perforations configured to expose the first layer to ambient atmosphere.

18. The label of claim 17, wherein the particles comprise an oxygen-sensitive material that changes color based on an amount of time the oxygen-sensitive material has been exposed to oxygen.

* * * * *